United States Patent [19]

Hatakeyama et al.

[11] Patent Number: 5,045,227
[45] Date of Patent: Sep. 3, 1991

[54] LIQUID CRYSTAL CELL

[75] Inventors: Hyoe Hatakeyama, Kukizaki; Shigeo Hirose, Matsudo; Hirohisa Yoshida, Kawasaki; Kunio Nakamura, Yokohama, all of Japan

[73] Assignee: Director-General of Agency of Industrial Science and Technology, Japan

[21] Appl. No.: 531,707

[22] Filed: Jun. 1, 1990

[30] Foreign Application Priority Data

Oct. 9, 1987 [JP] Japan .................. 62-256022

[51] Int. Cl.$^5$ ............................. C09K 19/54
[52] U.S. Cl. ................. 252/299.5; 252/299.01; 359/103
[58] Field of Search ............ 252/299.01, 299.6, 299.5; 428/1; 350/350 R

[56] References Cited

U.S. PATENT DOCUMENTS 3,690,745 9/1972 Jones ........................ 350/160 R
4,409,156 10/1983 Hoshi et al. .............. 252/299.01 X
4,940,576 7/1990 Walsh ........................... 424/70

FOREIGN PATENT DOCUMENTS 2585024 of 1985 France.

OTHER PUBLICATIONS

Molecular Crystals & Liquid Crystals, vol. 148, Jul. 1987, pp. 145–161, "Lyotropic Behavior of Nitrocellulose".
Molecular Crystals & Liquid Crystals, vol. 78, No. 1/4, Dec. 1981, pp. 123–134, "Liquid Crystal Formation in Aqueous Solutions of a Polysacchardie Schizophyllan".
Molecular Crystals and Liquid Crystals, vol. 34, 1976, pp. 97–103, "Liquid Crystalline Structure in Aqueous Hydroxypropyl Cellulose Solutions".
Chem. Abs. 97:219149s, 1982.

Primary Examiner—Robert L. Stoll
Assistant Examiner—Richard Treanor
Attorney, Agent, or Firm—Lorusso & Loud

[57] ABSTRACT

A liquid crystal cell is disclosed which comprises a pair of opposed substrates defining a space therebetween and each having one or more electrodes disposed thereon, and a liquid crystal material provided in the space, the liquid crystal material being a lyotropic liquid crystal composition containing water and a polymeric electrolyte dissolved in the water in an amount sufficient to form a liquid crystal phase.

4 Claims, 1 Drawing Sheet

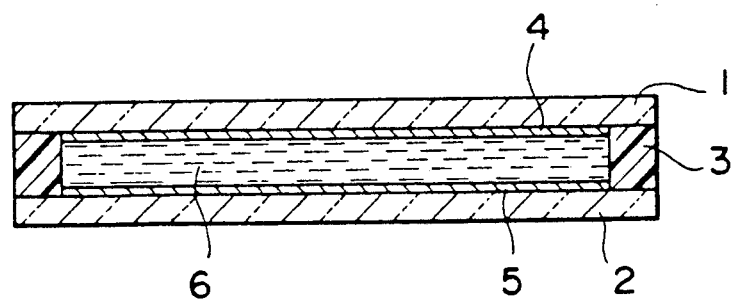

LIQUID CRYSTAL CELL

This invention relates to a liquid crystal cell useful for application to displaying devices, sensors, etc.

It is known that highly concentrated solutions of certain substances in suitable solvents form liquid crystals, generally called lyotropic liquid crystals. Examples of known lyotropic liquid crystals include sodium stearate in water, poly($\gamma$-benzyl-L-glutamate) in chloroform, poly-p-phenyleneterephthalamide in sulfuric acid, nucleic acid in water, hydroxypropylcellulose in water and a styrene/ethylene oxide block copolymer in ethylbenzene.

One problem associated with the conventional lyotropic liquid crystals is that they are not suited for actual use in display or sensor applications. In particular, known lyotropic liquid crystals have a low dielectric anisotropy so that a display device using such known liquid crystals is poor in sensitivity and requires a high electric voltage to change the molecular alignment.

The present invention has been made to solve the above problem of the conventional lyotropic liquid crystals and has as its object the provision of a liquid crystal cell useful for display or sensor applications.

In accordance with the present invention there is provided a liquid crystal cell comprising a pair of opposed substrates defining a space therebetween and each having one or more electrodes disposed thereon, and a liquid crystal material provided in said space, said liquid crystal material being a lyotropic liquid crystal composition comprising water and a polymeric electrolyte dissolved in the water in an amount sufficient to form a liquid crystal phase.

The present invention will now be described in detail below with reference to the accompanying drawing, in which the sole FIGURE is a cross-sectional view schematically illustrating a liquid crystal cell embodying the principle of the present invention.

Referring to the FIGURE, there is schematically illustrated a liquid crystal cell embodying the principles of the present invention. The liquid crystal cell includes two transparent substrates, generally glass plates 1 and 2, separated from each other by a frame or a spacer 3, between which is disposed a liquid crystal material 6. The glass plates 1 and 2 carry conventional, transparent electrodes 4 and counterelectrodes 5, respectively. A polarizer or a pair of polarizers may be provided behind the glass plate or plates 1 and 2.

The liquid crystal material 6 is a lyotropic liquid crystal composition which includes a polymeric electrolyte dissolved in water in an amount sufficient to form a liquid crystal phase.

The polymeric electrolyte preferably has a molecular weight of $10^2$–$10^6$, preferably $10^3$–$5 \times 10^5$ and has (a) cellulose, chitin, chitosan, xanthan, alginic acid, gellan gum, hyaluronic acid, pectic acid, heparin, condroitin, polyacrylic acid, polymethacrylic acid, polymaleic acid, polyvinyl alcohol, polystyrene, polyhydroxystyrene or lignin as its polymer skeleton, and (b) one or more dissociation groups bonded to said polymer skeleton and selected from salts of sulfuric acid group, sulfonic acid group, phosphoric acid group, phosphorous acid group and carboxylic acid group. Examples of suitable salts are alkali metal salts, alkaline earth metal salts, or onium salts such as ammonium salts, organic ammonium salts, phosphonium salts or sulfonium salts. Salts of carboxymethylcellulose, cellulose sulfate, chitin, chitosan, xanthan, alginic acid, gellan gum, polyacrylic acid, polymethacrylic acid, polyvinyl alcohol sulfate, polystyrene sulfonic acid or lignosulfonic acid are particularly preferred polymeric electrolytes.

These electrolytes are dissolved in water to give lyotropic liquid crystal compositions. The amount of the electrolyte should be such that the resulting composition show a liquid crystal phase. Generally, water is used in an amount of 0.1–10 parts by weight, preferably 0.5–3 parts by weigh per one part by weight of the polymeric electrolyte. If desired, an additive such as a metal salt, an acid, an alkali or a water-soluble organic solvent may further be incorporated into the lyotropic liquid crystal composition. The liquid crystal phases of the lyotropic liquid crystals of the present invention include nematic, smectic and cholesteric phases.

The liquid crystal composition according to the present invention exhibits a high dielectric anisotropy and can form a liquid crystal phase at a temperature of $-10°$ to $50°$ C. and, hence, it is very suited for use in optical display applications. Thus, the liquid crystal composition is provided in the space defined between a pair of opposed transparent substrates each having a transparent electrode or electrodes disposed thereon. Such a structure of the liquid crystal cell is well known in the art and may be fabricated in a manner known per se using suitable known substrates and electrodes.

The types of the display modes may vary according to the kinds of the liquid crystal composition. TN (twist nematic) type, DS (dynamic scattering) type, GH (guest-host) type, ECB (electrically controlled birefringence) type, etc. may thus be suitably adopted.

The temperature at which the liquid crystal composition of the present invention forms a liquid crystal cell ranges from about 183 K to 373 K. This temperature varies with the kind and the concentration of the polymeric electrolyte.

The following examples will further illustrate the present invention.

Example 1

Cellulose sulfate sodium salt (degree of substitution: 2.5) was dissolved in water in an amount shown in Table 1 below. The resulting solution was then tested for determination of an optimum temperature for the formation of a liquid crystal phase. In the range of the optimum temperature $\pm 30$ K, the solution was suitably employed as a liquid crystal material for an optical display cell. The results were as shown in Table 1. The formation of the liquid crystal phase was confirmed by means of a differential scanning calorimeter (DSC) and of a polarization microscope. The DSC measurement was carried out at heating and cooling rates of each 10 K/min. In Table 1 and in the following tables, "water content" refers to a weight ratio of water to the polymeric electrolyte used.

TABLE 1

| Solution No. | Water Content | Optimum Temperature (K) |
| --- | --- | --- |
| 1 | 0.52 | 310 |
| 2 | 0.62 | 308 |
| 3 | 0.70 | 306 |
| 4 | 0.86 | 294 |
| 5 | 1.08 | 292 |
| 6 | 1.23 | 290 |
| 7 | 1.36 | 284 |
| 8 | 1.80 | 280 |
| 9 | 2.03 | 278 |

Example 2

Carboxymethylcellulose sodium salt (degree of substitution: 0.6, degree of polymerization: 650) was dissolved in water and the solution was tested in the same manner as that in Example 1. The results are shown in Table 2.

TABLE 2

| Solution No. | Water Content | Optimum Temperature (K) |
|---|---|---|
| 1 | 0.43 | 326 |
| 2 | 0.52 | 323 |
| 3 | 0.72 | 326 |
| 4 | 0.95 | 328 |
| 5 | 1.05 | 326 |
| 6 | 1.22 | 330 |

Example 3

Carboxymethylcellulose magnesium salt (degree of substitution: 0.6, degree of polymerization: 650) was dissolved in water and the solution was tested in the same manner as that in Example 1. The results are shown in Table 3.

TABLE 3

| Solution No. | Water Content | Optimum Temperature (K) |
|---|---|---|
| 1 | 0.51 | 250 |
| 2 | 0.67 | 245 |
| 3 | 0.76 | 232 |
| 4 | 1.40 | 223 |
| 5 | 1.52 | 218 |

Example 4

Carboxymethylcellulose aluminum salt (degree of substitution: 0.6, degree of polymerization: 650) was dissolved in water and the solution was tested in the same manner as that in Example 1. The results are shown in Table 4.

TABLE 4

| Solution No. | Water Content | Optimum Temperature (K) |
|---|---|---|
| 1 | 0.31 | 252 |
| 2 | 0.67 | 248 |
| 3 | 0.86 | 240 |
| 4 | 1.00 | 232 |
| 5 | 1.58 | 228 |
| 6 | 1.62 | 223 |

Example 5

Xanthan sodium salt was dissolved in water and the solution was tested in the same manner as that in Example 1. The results are shown in Table 5.

TABLE 5

| Solution No. | Water Content | Optimum Temperature (K) |
|---|---|---|
| 1 | 0.54 | 295 |
| 2 | 0.57 | 293 |
| 3 | 0.65 | 291 |
| 4 | 0.75 | 288 |
| 5 | 0.81 | 285 |
| 6 | 1.06 | 283 |
| 7 | 1.12 | 281 |
| 8 | 1.40 | 279 |

Example 6

Polystyrene sulfonic acid sodium salt (molecular weight: 70,00) was dissolved in water and the solution was tested in the same manner as that in Example 1. The results are shown in Table 6.

TABLE 6

| Solution No. | Water Content | Optimum Temperature (K) |
|---|---|---|
| 1 | 0.80 | 310 |
| 2 | 0.90 | 305 |
| 3 | 1.00 | 300 |
| 4 | 1.32 | 292 |
| 5 | 1.70 | 288 |

Example 7

Lignosulfonic acid sodium salt (prepared from a soft wood) was dissolved in water and the solution was tested in the same manner as that in Example 1. The results are shown in Table 7.

TABLE 7

| Solution No. | Water Content | Optimum Temperature (K) |
|---|---|---|
| 1 | 0.46 | 288 |
| 2 | 0.71 | 270 |
| 3 | 0.91 | 267 |
| 4 | 1.36 | 265 |
| 5 | 1.46 | 264 |
| 6 | 2.04 | 263 |
| 7 | 2.31 | 262 |

Example 8

Alginic acid sodium salt was dissolved in water and the solution was tested in the same manner as that in Example 1. The results are shown in Table 8.

TABLE 8

| Solution No. | Water Content | Optimum Temperature (K) |
|---|---|---|
| 1 | 0.52 | 269 |
| 2 | 0.63 | 268 |

Example 9

Gellan gum sodium salt was dissolved in water to obtain a solution having a water content of 1.12. The solution was found to have an optimuum liquid crystal phase temperature of 277 K.

Example 10

Polyvinyl alcohol sulfate potassium salt (degree of substitution: 2.7, degree of polymerization: 1,500) was dissolved in water to obtain a solution having a water content of 1.0. The solution was found to have an optimum liquid crystal phase temperature of 258 K.

Example 11

Polyacrylic acid sodium salt (molecular weight: 2,100) was dissolved in water and the solution was tested in the same manner as that in Example 1. The results are shown in Table 9.

TABLE 9

| Solution No. | Water Content | Optimum Temperature (K) |
|---|---|---|
| 1 | 0.50 | 338 |
| 2 | 1.00 | 335 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A liquid crystal cell comprising a pair of opposed substrates defining a space therebetween and each having one or more electrodes disposed thereon, and a liquid crystal material provided in said space, said liquid crystal material being a lyotropic liquid crystal composition consisting essentially of water and a polymeric electrolyte dissolved in the water in an amount sufficient to form a liquid crystal phase, said polymeric electrolyte having (a) a polymer skeleton of chitin, chitosan, alginic acid, gellan gum, hyaluronic acid, pectic acid, heparin, condroitin, polyacrylic acid, polymethacrylic acid, polymaleic acid, polyvinyl alcohol, polystyrene, polyhydroxystryrene or lignin, and (b) one or more dissociation groups bonded to said polymer skeleton and selected from salts of sulfuric acid group, sulfonic acid group, phosphoric acid group, phosphorous acid group and carboxylic acid group.

2. A liquid crystal cell as set forth in claim 1, wherein said polymeric electrolyte has a molecular weight of between $10^2$ and $10^6$.

3. A liquid crystal cell as set forth in claim 1, wherein said salts are alkali metal salts, alkaline earth metal salts, or onium salts.

4. A liquid crystal cell as set forth in claim 1, wherein said polymeric electrolyte has a linear, branched or crosslinked polymer skeletal structure.

* * * * *